United States Patent [19]
Akre

[11] Patent Number: 6,053,129
[45] Date of Patent: Apr. 25, 2000

[54] ANIMAL WALKING LEASH APPARATUS

[76] Inventor: Marvin L. Akre, 6343 S. Cedar Dr., Prineville, Oreg. 97754

[21] Appl. No.: 09/085,337

[22] Filed: May 26, 1998

Related U.S. Application Data

[60] Provisional application No. 60/050,415, Jun. 4, 1997.

[51] Int. Cl.[7] .................................................. A01K 27/00
[52] U.S. Cl. ........................... 119/795; 119/798; 119/799
[58] Field of Search .................................. 119/795, 792, 119/793, 794, 797, 798, 863

[56] References Cited

U.S. PATENT DOCUMENTS

| | | |
|---|---|---|
| 1,509,781 | 9/1924 | Roth . |
| 1,924,596 | 8/1933 | Davis . |
| 2,023,950 | 12/1935 | Carter . |
| 2,275,701 | 3/1942 | Taylor . |
| 2,593,940 | 4/1952 | Van Meter ............................. 119/799 |
| 2,737,154 | 3/1956 | Michonski . |
| 4,993,366 | 2/1991 | Sager ..................................... 119/798 |
| 5,732,661 | 3/1998 | Lagro ..................................... 119/795 |
| 5,803,017 | 9/1998 | Stewart .................................. 119/799 |
| 5,813,368 | 9/1998 | Rasmussen ............................. 119/799 |
| 5,850,807 | 12/1998 | Keeler ................................... 119/799 |

*Primary Examiner*—Peter M. Poon
*Assistant Examiner*—Yvonne Abbott
*Attorney, Agent, or Firm*—Olson and Olson

[57] ABSTRACT

An improved walking leash apparatus for dogs and other animals utilizes a length of elastic, stretchable, bungee-type cord anchored to and carried within a substantially rigid, hollow tube member having a hand grip portion with a safety wrist snap, the forward terminal end of the elastic cord member mounting a collar fastener for connection to the collar of a dog to be walked, whereby the jerks and pulls of the animal are accommodated in shock-absorbing fashion by the leash, to the benefit and comfort of both operator and animal.

4 Claims, 2 Drawing Sheets

ANIMAL WALKING LEASH APPARATUS

This application claims the benefit of the priority filing date of U.S. Provisional application Ser. No. 60/050,415, filed Jun. 4, 1997.

BACKGROUND OF THE INVENTION

This invention relates to animal leashes, such as those that are provided for walking dogs and the like. Dog leashes are well known in the art and have been provided heretofore in a variety of different forms to accomplish various desired purposes, but all being characterized by the provision of a leash arrangement that provides a direct, undampened attachment of animal to handler through an inelastic, unyielding leash cord member.

Typically, dog leashes and the like comprise a fastener hook member and a hand grip member mounted on opposite terminal ends of a leash cord member commonly formed of chain-link material or flexible but inelastic strap or cords woven or otherwise formed of synthetic plastic material. Walking leashes have also been provided in which the leash cord member is carried on a spring-tensioned reel in the handle member whereby, upon release of a finger-operated lock member, the leash cord may be pulled from the handle member to significantly increase the working length of the leash and thereby offer the animal a much greater range of free movement as the handler may desire given the conditions surrounding them.

Applicant however is aware of no walking leash structure which is arranged to attend the basic end inherent issues of the direct and unyielding transmission of shock, pull and jerk forces of the animal on the user and vice versa, features which detract from the enjoyment of the walk and may be uncomfortable and even harmful under some circumstances to both parties. As is well known, dogs, especially dogs that are untrained to "heel", can be excited when taken on walks and often tend to pull strongly against the leash and stop and unexpectedly start up again, jerking at the leash routinely throughout the course of a walk. As is easy to understand, these pulls and sudden jerks are instantly and directly transmitted through the suddenly taut leash to the handler's arm and shoulder, often without adequate warning to prepare for the pulling force by setting his muscles. These same sudden forces of course are exerted against the dog's neck in cases where neck collars are used and result in the exertion of strong forces against the windpipe and other soft tissues of the dog's neck.

It is therefore seen that there is a need for a more "humane" and user-friendly, shock-absorbing leash arrangement that can dampen the sudden and significant shock transmission on and between animal and handler that is inherent in conventional leash constructions. There is also a need for a leash arrangement that may serve as an automatic training aid which may permit and encourage an animal to stop straining against a leash when on walks.

Toward this end, the walking leash device of this invention provides a leash body member in the form of an elongated, hollow tube. Preferably substantially rigid, the tube mounts a user handle arrangement at one of its ends and is open through its opposite end, the tube mounting and elastic, stretchable leash cord member, such as one formed of bungee cord material of a desired length and tension for the purpose, for extension from the tube. The terminal end of the elastic, stretchable cord mounts a fastener hook member for attachment to the collar of a dog. Restrained thusly, as the dog pulls or suddenly takes off, his movement is made against a progressively increasing, counter-pull tension as the bungee cord stretches toward its limit, which typically is at a point that is more than double the relaxed length of the cord.

Thus, in this manner there can be no sudden shock transmission imposed on either handler or animal, and, since there is always a constant and increasing pull tension on the dog whenever he exerts against the leash, he is being constantly reminded, and therefore is subtly learning, in a passive way, to maintain a distance and a pace that translates gently into a comfort factor to him.

SUMMARY OF THE INVENTION

In its basic concept, this invention provides an improved animal leash which utilizes a length of elastic, bungee-type cord anchored to and carried within a rigid, hollow tube member having a hand grip portion, the outer terminal end of the elastic cord mounting a collar fastener for releasable securement to the collar of a dog to be walked.

It is by virtue of the foregoing basic concept that the principal object of this invention is achieved; namely, the provision of a walking leash which provides an elastic, shock-absorbing connection between animal and handler.

Another object of this invention is the provision of an animal walking leash of the class described which may, if desired, provide for selectable, adjustable stretch and tension of the cord member as well as temporary locking of the cord member against stretching for increased control of the animal in confined or precarious spaces and the like.

Another object of this invention is the provision of an animal walking leash of the class described which may inherently assist in the animal's learning of desirable leash walking habits and behaviors.

A further object of this invention is the provision of an animal walking leash of the class described which is of simplified construction for economical manufacture.

The foregoing and other objects and advantages of the present invention will appear from the following detailed description, taken in connection with the accompanying drawings of a preferred embodiment.

DESCRIPTION OF THE PREFERRED EMBODIMENTS

Figure 1:
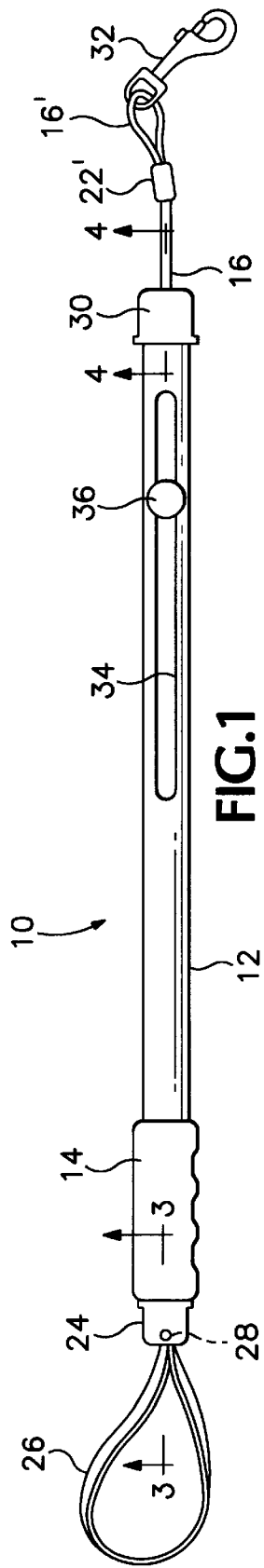
FIG. 1 is a plan view of a walking leash apparatus embodying features of the present invention, the apparatus being shown in relaxed, non-tensioned condition.

FIG. 1 illustrates a leash apparatus 10 which embodies features of my invention. As seen, a preferably rigid, hollow tube 12 is provided in the form of a desired length of suitable material such as, in the case of the illustrated example, conventional thick-walled PVC pipe. As an example, the tube 12 illustrated herein is approximately 24 inches in length and has an approximately ¾ inch outside diameter. One terminal end portion of the tube, hereinafter referred to as the rear end of the tube, preferably mounts a comfortable hand grip 14 for convenient grasping by the dog handler during use. The tube 12 provides a base mounting means for securely mounting an elongated, elastic, stretchable, tension leash cord member 16 which in turn is provided for releasable attachment to an animal to be walked.

In the preferred embodiment of FIGS. 1–4, a bungee cord 16 is provided from stock having desired, predetermined pull-tension qualities suitable for the purpose. These various qualities, for example, strength of tension, amount of linear stretch, etc., may be selected and varied as needed or desired to accommodate such factors as use with different size, weight and strength groupings of dogs; desired overall maximum leash length defining an animal's range of movement; and other such factors.

Figure 3:
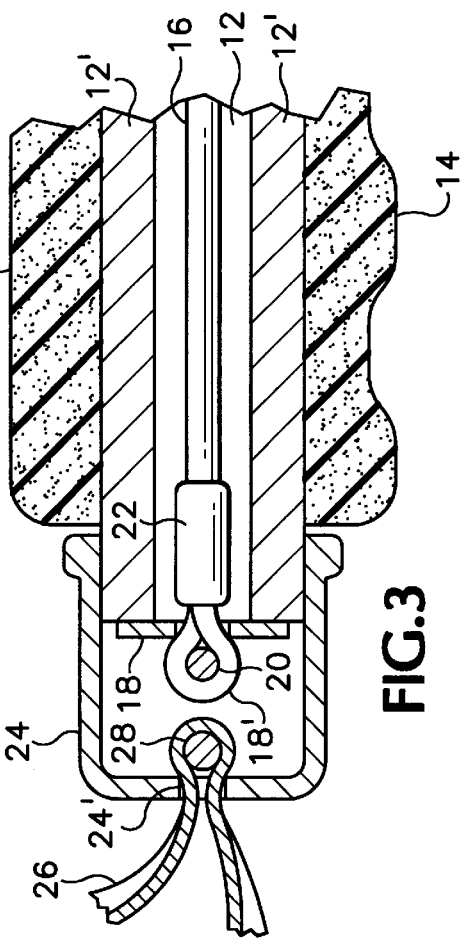
FIG. 3 is a fragmentary sectional view through the rear terminal portion of the apparatus of FIG. 1, taken along the line 3—3 in FIG. 1.

With reference now to the sectional view of FIG. 3, one simple leash cord mounting arrangement is shown which is both effective and easy to manufacture and assemble. In this, one terminal end of a bungee cord 16 is inserted through the bore 18' of a flat washer 18 having an outside diameter that is slightly smaller than the outside diameter of the tube 16. The bungee cord is wrapped around a retainer pin 20 and threaded back through the washer bore 18' whereupon the terminal end of the bungee cord is there fixedly clamped by a crimp clamp 22 as shown. The bungee cord is then inserted into the rear end of the tube 12, the front walls 12' at the terminal end of tube 12 providing an abutting and supporting base surface for the washer 18 as shown. Other cord end-securing arrangements and fittings suitable for the purpose may alternatively be used just as well.

Figure 4:
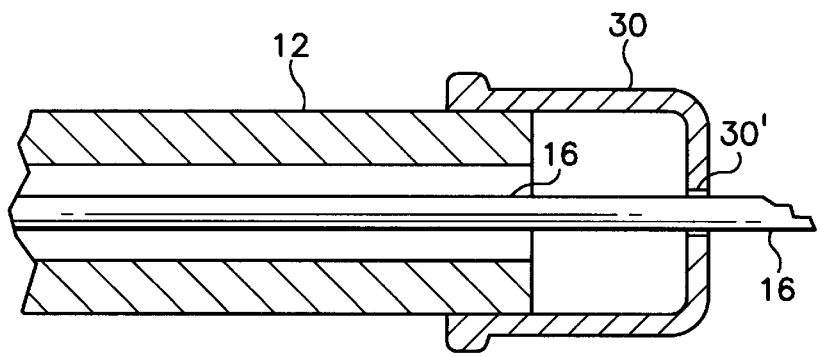
FIG. 4 is a fragmentary sectional view through the front terminal portion of the apparatus of FIG. 4, taken along the line 4—4 in FIG. 1.

A rear end cap 24 is mounted on the terminal end of tube 12 to cover the end of the tube and prevent displacement of the pin 20 and washer 18. As seen in FIGS. 1 and 3, the end cap 24 preferably includes a bore 24' for receiving a safety wrist strap 26 which may be formed as a loop of strap material inserted through the opening 24 and captured within the cap 24 by a retaining pin 28 in similar fashion as has been described in connection with retaining pin 20. The provision of a safety wrist strap is preferred in order to assure against the possibility of injury to the animal should the user lose hold of the hand grip when the animal is pulling and the elastic leash cord is under stretched tension. The opposite, front terminal end of the tube 12 is preferably closed with a front end cap 30 which is provided with an end bore 30' through which the elastic leash cord 16 freely extends, as shown in FIG. 4 of the drawings. The forward terminal end of the elastic leash cord 16 may, as illustrated in FIG. 1, be formed as a loop 16' using a second crimp clamp 22' for securing a desired fastener hook member 32 arranged to engage a dog's collar.

Figure 2:
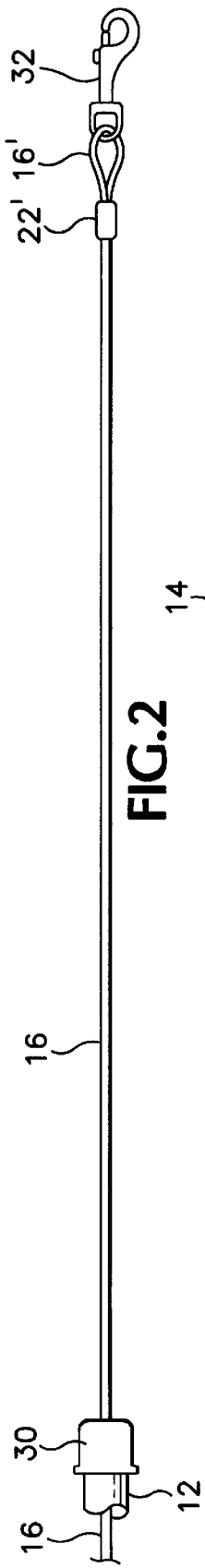
FIG. 2 is a fragmentary plan view of the front terminal end of the leash apparatus tube of FIG. 1 but with the elastic tension cord shown in a tensioned, stretched condition as would be experienced during use.

With the foregoing construction thus described, it will be understood that FIG. 1 of the drawings shows the leash apparatus of this invention in fully relaxed, inoperative condition, and FIG. 2 of the drawings illustrates the leash apparatus in a condition representing an in-use state in which a dog would be pulling significantly and stretching the leash cord member. As mentioned previously, bungee cords and the like typically possess a stretching capability of double or more their overall, relaxed length, providing a progressively stronger pull-tension as they are stretched to their maximum. Thus, as seen in the embodiment illustrated in FIGS. 1 and 2, the elastic leash cord is preferably capable of stretching to approximately 2 to 2½ times the length of the rigid body member, but may for various needs, be otherwise pre-selected to accommodate a wide range of stretch lengths of at least 1½ times the corresponding body member length, as may be indicated depending on the size and weight of animal, range of movement to be permitted, etc. It may be desirable that the particular pull tension of the elastic cord material be selected according to the particular corresponding weight and strength of the dog so that he will not be able to normally exert a pull sufficient to reach the maximum of the cord so that sudden jerks and shocks are completely eliminated.

Also, it may be desirable, as in the case of large, strong dogs for example, that more than one bungee cord be provided for operation in unison with each other for increased tension. In another alternative, a selected portion of the length of a single bungee cord may be "reinforced" with a desired length of an additional bungee cord crimp-clamped to the single bungee cord. In this manner, the pull-tension throughout an initial stretch-length of the leash cord will be different than the greater pull-tension required for the subsequent, remaining stretch-length of the leash cord. This may be advantageous in the handling and/or training of dogs, and particularly in the case of large, powerful dogs that may too easily stretch the leash cord to its limit.

There may be circumstances in which it may be desired that the dog's range of movement be restricted temporarily for increased control of the animal, but without loss of all shock-absorbing qualities of this invention. For example, when walking the dog in confined, crowded or precarious areas such as busy sidewalks, veterinarian offices, close to traffic lanes, etc. it may be important to keep the dog under tighter control. In this regard, a simple and adjustable means for selectively varying the amount of leash cord stretch length is illustrated in FIG. 1 of the drawings wherein the tube 12 is provided with a longitudinally elongated slot 34 that slidably carries a threaded friction clamp set screw 36 arranged for threaded movement transversely into the hollow interior of the tube. The inner terminal end of the set screw may mount a simple foot member (not shown) arranged to frictionally engage the bungee cord upon turning of the set screw inwardly and press the bungee cord in clamping condition against the opposite side wall 12' of the tube 12. In this manner, the bungee cord is permitted to stretch only forwardly of that particular clamping point, thereby reducing the available stretch of the bungee cord by a factor corresponding to its new, shortened length.

Although an elongated slot 34 is shown herein to illustrate a suitable leash cord clamping arrangement that permits adjustable fixing of the allowable cord stretch length, the slot 34 could alternatively be provided as a simple threaded bore (not shown) positioned at a desired point along the tube 12 if merely a "fixed or released" option is desired. Further, although the particular clamping screw arrangement is shown herein, it will be obvious to those skilled in the art that many other equivalent structural arrangements alternatively be provided to engage the elastic leash cord for the described purpose.

Figure 5:
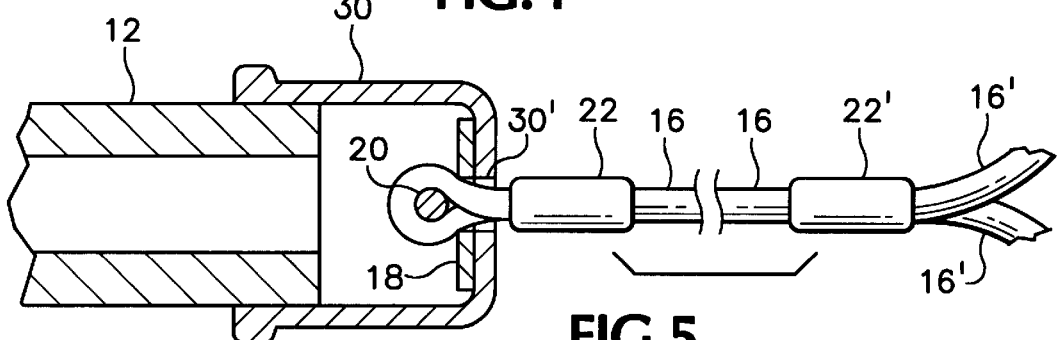
FIG. 5 is a fragmentary sectional view, similar to the view of FIG. 4, but illustrating another embodiment of the invention in which the elastic tension cord is mounted in the front end of the tube.

The embodiment of FIG. 5 is provided herein in order to illustrate an alternative leash cord mounting arrangement configured to secure a shorter bungee cord length for full time restriction of and control over an animal's range of movement relative to the handler, while still providing full, shock-absorbing tension mechanism for the animal and its handler. In this regard, the aforementioned cord end, washer 18, pin 20 and crimp clamp 22 arrangement described previously is arranged in connection with the front end cap 30 and associated bore 30' instead of the hollow tube 12.

Figure 6:
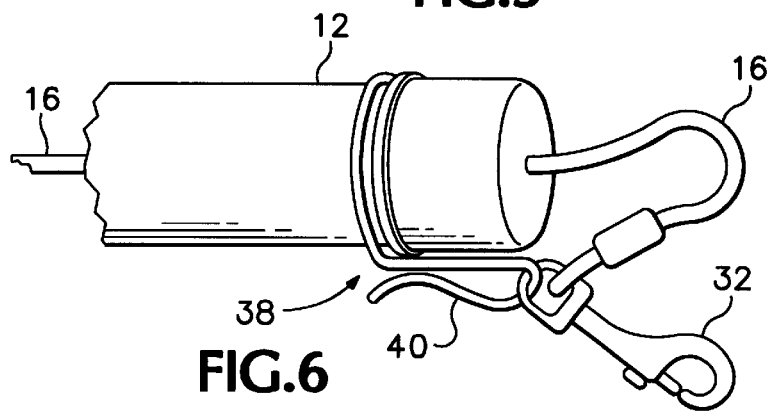
FIG. 6 is a fragmentary plan view of the front portion of the leash apparatus of FIG. 1 but including a hook member on the tube for engaging the collar fastener directly to prevent any stretching of the cord member for temporary, increased control of the animal as may be needed or desired in confined or dangerous areas.

Further, there may also be circumstances in which it may be desired or necessary that the animal's range of movement be temporarily limited and controlled such that no stretching of the cord is permitted. FIG. 6 shows one example of a securing bracket 38 that provides means for releasably securing the fastener 32 to the rigid tube 12 portion of the leash, and thereby effectively disabling the action of the elastic cord member. The animal is thus secured directly and positively to the rigid tube portion of the leash, by connection of the fastener member 32 to the hook member 40 of the bracket 38 as shown.

From the foregoing it will be apparent to those skilled in the art that the walking leash apparatus of this invention provides a more animal-friendly and handler-friendly leash arrangement than those provided heretofore as well as one that specifically addresses the important issue of the potentially harmful effect of sudden and strong jerking and pulling between the walking parties by providing a shock absorbing mechanism therebetween. Still further, it provides the animal with a passive and subtle reminding and training device which may, through the constant and continual gentle-to-forceful pull tension during use, teach the dog, more effectively than the handler's sudden yanks and jerks on a conventional leash, to seek and maintain a more comfortable non-pulling walking arrangement, making the experience more comfortable and enjoyable for both parties.

Figure 7:
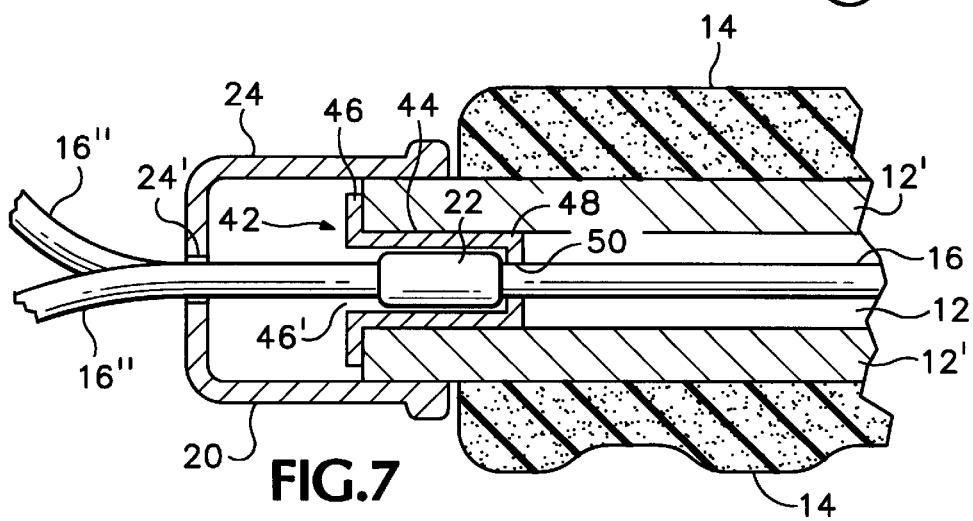
FIG. 7 is a fragmentary sectional view similar to FIG. 3 showing an alternative wrist strap and cord-securing arrangement.

It will also be apparent to those skilled in the art that various changes, other than those already described hereinbefore, may be made in the size, length, type, number and arrangement of parts described hereinbefore without departing from the spirit of this invention and the scope of the appended claims. For example, an alternative arrangement for the wrist strap and leash cord mounting configuration shown in FIG. 3 may be provided for simplified manufacture if desired. FIG. 7 of the drawings shows the bungee cord 16 passing through the crimp connector 22, out through the opening 24' in the end cap 24 and forming a wrist strap loop (not shown) of bungee cord material 16", the terminal end of the cord being threaded back through the opening 24' and into the crimping clamp 22 where it is fixedly secured. In replacement of the washer 18 and pins 20, 28 assemblies described in connection with the embodiment of FIG. 3, a securing member 42 is formed as a hollow sleeve 44 configured to be received within the hollow tube 12 and to contain the crimp clamp 22, the sleeve having an enlarged head 46 with an opening 46' and an inner terminal end 48 of reduced cross section with an opening 50 therethrough to permit passage of the cord 16 but not the crimp clamp 22. In this manner, the pull force of the dog on the leash cord 16 is borne by the securing member 42 and the crimp clamp 22 while also isolating the outer wrist strap portion 16" of the leash cord from that pull force, as is obvious.

Having thus described my invention and the manner in which it is used, I claim:

1. A walking leash apparatus for dogs and other animals, the walking leash comprising:

a) an elongated, substantially rigid body member having a predetermined length with opposite, terminal, longitudinal ends defining front and rear ends of the body member, b) operator engagement means associated with the rear end of the body member for facilitating comfortable and secure engagement of the body member by an operator of the walking leash, and a safety wrist strap member associated with said rear end of the body member for providing protection against inadvertent release of the body member by an operator when the leash is under tension of a pulling animal, c) at least one elastic, stretchable leash cord member formed of a length of a bungee cord-type product having predetermined stretch tension and stretch length characteristics, the leash cord member secured adjacent one of its ends to the rigid body member for extension of its opposite end portion from the front terminal end of the rigid body member, and d) an animal-engaging fastening member secured to the end portion of the elastic, stretchable leash cord member extending from the body member, the fastener member configured to releasably engage an animal to be walked and secure the animal to the leash against inadvertent and unintended separation, whereby in walking an animal on the leash, the animals pulls and jerks are accommodated by the stretchable leash cord member and translated into a gently increasing, resistive tension on the animal, thereby providing a more humane and less potentially harmful control of the animal while also providing a shock-absorbing mechanism between the operator and the animal being leash-walked.

2. The walking leash apparatus of claim 1 including leash cord stretch limiting means on the body member for adjustably engaging a selected, intermediate portion of the elastic leash cord and releasably securing said portion to the body member to prevent stretching tension of the cord member rearwardly of said engaged portion, whereby to temporarily and selectively reduce and limit the stretch length of the elastic leash cord as may be needed or desired according to existing walking conditions.

3. The walking leash of claim 1 including leash cord stretch preventing means on the body member for engaging the leash cord member extending from the front end of the body member to substantially prevent any stretching of the cord member for temporary, increased control of the animal being walked when surrounding walking conditions so dictate.

4. The walking leash apparatus of claim 1 wherein said wrist strap member is formed as a loop extension of the elastic leash cord member extending out of the rear end of the rigid body member rearwardly of the leash cord securement to the body member.

* * * * *